April 7, 1970  R. T. FIELDS ET AL  3,505,157
INTEGRALLY MOLDED NET
Filed May 23, 1966  2 Sheets-Sheet 2
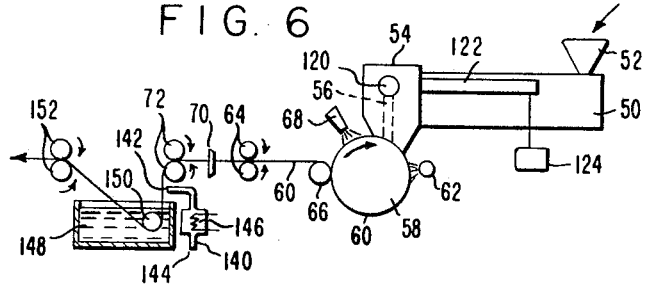
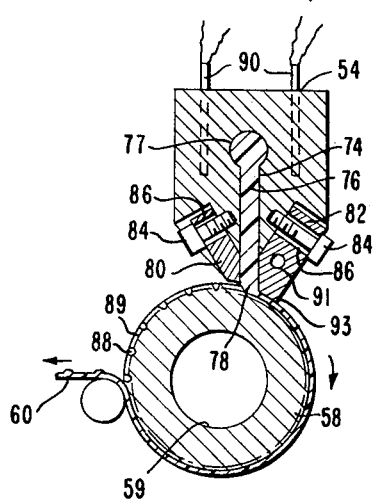
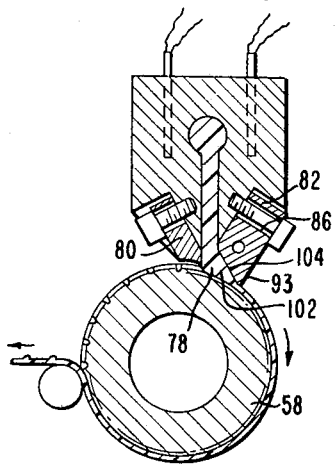
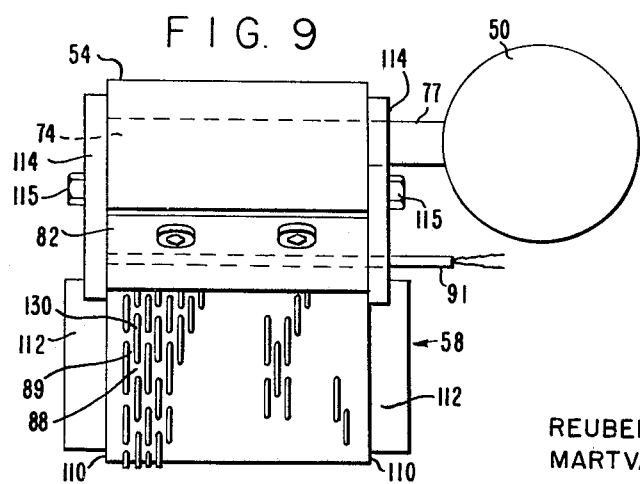
INVENTORS
REUBEN T. FIELDS
MARTVAL J. HARTIG
BY  *Edwin Tocker*
ATTORNEY United States Patent Office 3,505,157
Patented Apr. 7, 1970

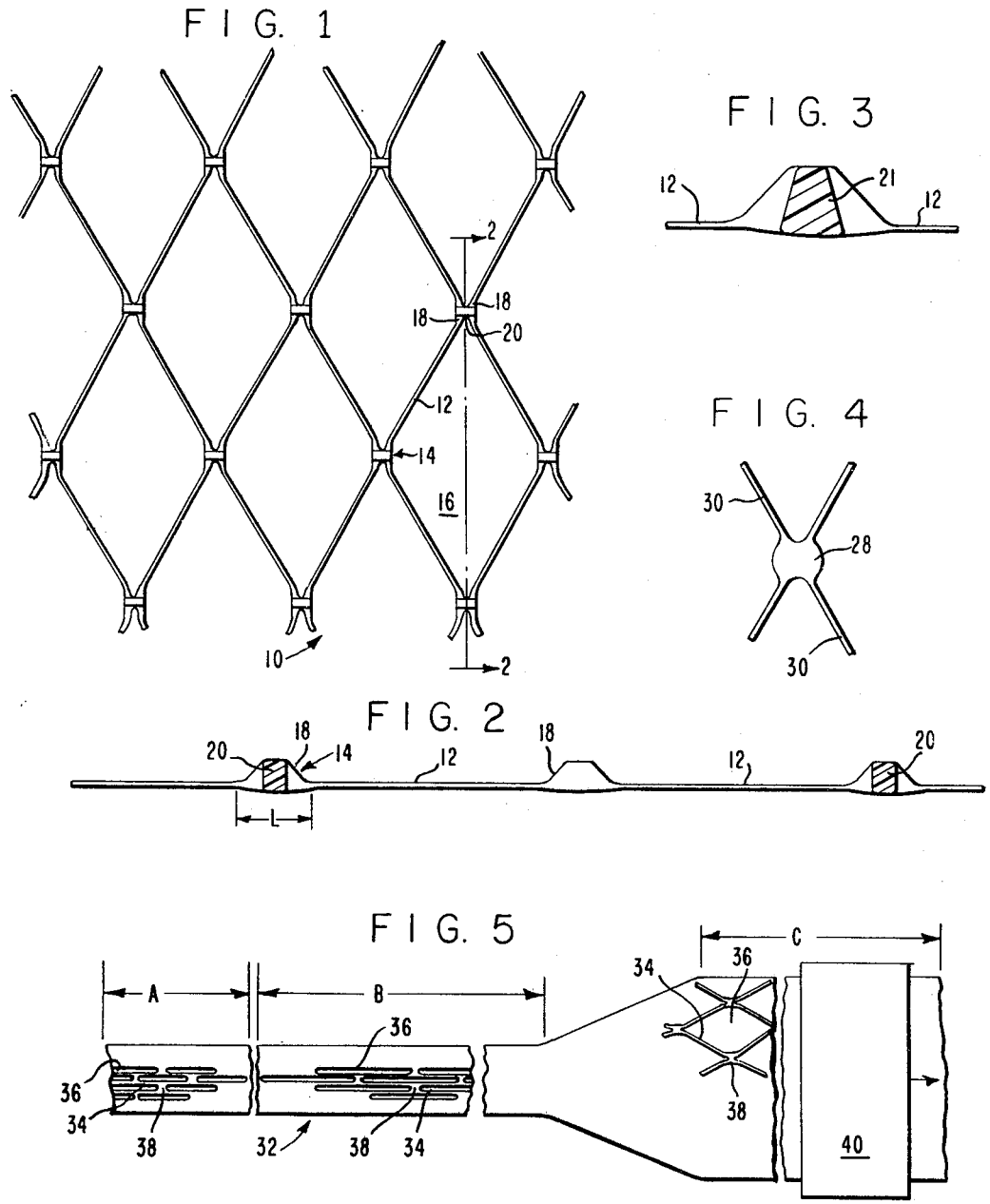

3,505,157
INTEGRALLY MOLDED NET
Reuben T. Fields and Martval J. Hartig, Wilmington, Del., assignors to E. I. du Pont de Nemours and Company, Wilmington, Del., a corporation of Delaware
Filed May 23, 1966, Ser. No. 552,192
Int. Cl. B32b 3/10
U.S. Cl. 161—109                                            2 Claims

ABSTRACT OF THE DISCLOSURE

Net is disclosed which although being drawn in only one direction, is bi-axially strong, the net comprising thermoplastic resin formed into oriented strands integrally molded with intersections which are substantially non-oriented, the intersections being at least 50% as strong as the strand.

---

This invention relates to net of thermoplastic resin and to processes for making this net.

The net of the present invention comprises integrally molded, uniplanar intersecting strands of thermoplastic resin with the strands and intersections thereof having a balanced strength so as to give the net high, multi-directional strength. This balance is obtained by the intersections of the strands being substantially non-oriented and the strands between the intersections being oriented, with the cross-sectional areas of the intersections and the strands being matched to produce an intersection strength which has at least 50% of the strength of the strand. Ideally by way of example, the strength of the unoriented thermoplastic resin in the intersection can be 4500 p.s.i. while that of the oriented strand can be 45,000 p.s.i., and the cross-sectional area of the intersection is 10 times that of the strand. The result of this ideal relationship is a net in which the strengths of the strand and intersections thereof are the same.

The net of the present invention makes optimum use of the thermoplastic resin with which it is made. The oriented strands between intersections provide maximum strength with a minimum use of resin, with the resin in the strand intersections having sufficient area to give the net the strength desired for a given strand strength.

The net of the present invention can be made by forming a patterned web of thermoplastic resin, the pattern of the web including a plurality of strands extending parallel to the length of the web, with the strands being joined together in alternating fashion by longitudinally spaced and preferably, relatively thicker intersections (thicker in the directions normal to the longitudinal draw direction), longitudinally drawing the web which results in a lengthening of the strands, transversely opening-up the drawn web to form a net, and heat stabilizing the net to remain in the opened-up condition.

In another embodiment of the process of the present invention, the longitudinal drawing step is omitted whereby a somewhat more rigid transversely-opened up net is obtained.

In each of these embodiments a great economy of space is obtained in that the patterned web can be made in a relatively narrow width and then opened-up to a large width of net. Generally, the longitudinally drawn web can be opened up from 10 to 100 times the original width of the web.

These and other embodiments will be more fully described in the following discussion and in the accompanying drawings in which:

FIG. 1 is a plan view of one embodiment of net of the present invention;

FIG. 2 is an enlarged section taken along line 2—2 of FIG. 1;

FIG. 3 shows another embodiment of bridge cross-section which can be used in net of the present invention;

FIG. 4 shows another embodiment of a strand intersection for net of the present invention;

FIG. 5 shows a plan view of a web in the various stages of manufacturing to make net of the present invention;

FIG. 6 shows, diagrammatically, apparatus for making the web of FIG. 5;

FIG. 7 shows, in cross-section, one embodiment of molding apparatus for use in the apparatus of FIG. 6;

FIG. 8 shows, in cross-section, another embodiment of apparatus for use in the apparatus of FIG. 6; and FIG. 9 shows an embodiment for laterally confining molten thermoplastic resin.

Referring now to the drawings, FIGS. 1 and 2 show a net 10 of the present invention consisting of integrally molded strands 12 and intersections 14 of the strands, which together define diamond-shaped apertures 16. The net is made of thermoplastic resin. Integrally molded means molded as a unit from contiguous (contacting) masses of the molten resin rather than molded into shapes from separate masses of molten resin which are then brought together and heat bonded, the area of heat bond representing a plane of weakness. Intersections 14 consist of a pair of sections 18 which are thick relative to the cross-section of strands 12, in which the thickness extends out of the plane of the net as best shown in FIG. 2. The intersections are uni-planar in the sense that they are not formed from overlapping strands, but rather are molded junctions of strands lying in a common plane. The sections taper into their respective uniplanar strands, without having any sharp corners present between section 18 and strand 12. The sections 18 of each pair thereof are integrally joined, without sharp corners, by bridges 20, which occupies only a fraction of the longitudinal length "L" of the sections 18. The cross-sectional shape of the bridge can be varied such as to the essentially trapazoidal shape of bridge 21 of FIG. 3.

The relatively thin strands 12 achieve strength by being uniaxially oriented. The intersections 14 are non-oriented but achieve strength by having a large cross-sectional area relative to that of a drawn strand. The orientation of the strands and relative cross-sectional area of the intersections are balanced so that the intersection strength is at least 50%, and preferably at least 75% of the strength of a strand coming into its (the strand's) respective intersection.

Since the intersections are non-oriented, they have equal strength in all directions of pull upon the net 10. Since the strands 12 align themselves in the direction of any pull upon the net, they too, give multi-directional or biaxial strength to the net.

The selective orientation of the strands of net 10 is obtained by longitudinally drawing a preform of the net in which the cross-sectional area of an intersection in the preform, corresponding to an intersection, 14, is at least 1.25 times, and preferably at least 1.50 times, the cross-sectional area of two strands in the preform, corresponding to strands 12. This differential in cross-sectional areas enables the strands to be drawn and the intersections to remain undrawn and therefore unoriented. Preferably, the amount of longitudinal draw on the preform is that which gives a strand lengthening of at least 2.5 and preferably at least 3 times the original length.

This lengthening of the strand reduces its cross-section, while that of the intersections remains without appreciable change. By having the strands taper smoothly into the intersection, the lengthening can occur without breakage. There is thus a transition area between oriented and non-oriented resin in the junction of strand 12 with intersection 14 of the finished net 10. It has been found that optimum strength properties of the net can be realized when the sections 18 of the strand intersections have at some point prior to junction with bridge 20 a cross-sectional area which is at least 3 and preferably at least 6 times the smallest cross-sectional area of a drawn strand coming into its respective intersection. This area differential represents the point at which orientation of the intersection has ceased. By having this area of transition precede the bridge 20, the bridge remains without any appreciable orientation. Preferably, therefore, the bridge 20 also has a cross-sectional area parallel to the direction of draw which is at least 6 times that of each of the strands coming into its respective intersection.

FIG. 4 shows another embodiment of thickened intersection, in which the thickened intersection 28 lies in the plane of the strands 30 of the netting. The same degree of draw and area of transition as discussed with respect to the net of FIGS. 1 and 2 can be observed for this embodiment to obtain a net of balanced, multi-directional strength. In general, intersections of strands of the net of this invention should have an entire cross-sectional area which is at least 5 times that of a drawn strand coming into the intersection.

A preform which is suitable for use in making net of the present invention is shown as section A of the web 32 of FIG. 5. Section A of the web has formed into the surface shown a pattern consisting of a plurality of strands 34 extending parallel to the length of the web and longitudinal rows of slots 36 separated one from the other by longitudinally spaced intersections 38 which interconnect strands 34 in alternating fashion.

Section B of the web 36 represents longitudinally drawn web portion of section A. Because of the longitudinal draw, the slots 36 of section A are further elongated as are the strands 34. The intersections 38, however, because of their greater thickness relative to that of the strands remain substantially unlengthened by the longitudinal draw. As a result of the lengthening of strands 34, they become thinner and more flexible, which enables the web of section B to be transversely opened-up without any appreciable drawing or orientation.

Section C of the web 32 of FIG. 5 represents the transversely opened-up web of section B. This transverse opening-up gives the net such as is shown in FIGS. 1 and 2 with the strands 34 and slots 36 corresponding to the strands 12 and apertures 16 of FIG. 1 and with the intersections 38 corresponding to the intersections 14 of FIG. 1. The web of section C of FIG. 5 is then passed through a heater 40 to heat stabilize the net in the opened-up condition. The longitudinal drawing step can be omitted in which case the transverse opening-up of the web gives a somewhat stiff net.

The apparatus for carrying out the longitudinal drawing and transverse opening-up of the patterned web is generally conventional, such as that which is shown in U.S. Pat. No. 3,137,746 to Seymour et al.

Apparatus suitable for continuously molding section A of the patterned web 32 of FIG. 5 is shown in FIG. 6. In this figure, an extruder 50 is equipped with a hopper 52 for receiving thermoplastic resin and melting it under pressure. A die 54 receives the pressurized molten resin through its rear (hidden) side from the extruder and passes the resin along a path 56 which terminates in an outlet in pressure-seal relation with a rotating patterned roll 58 and directs the resin substantially free of pressure drop and in the absence of air into the pattern of the roll. The roll 58 continuously moves the molten resin away from the outlet of path 56, thereby forming a continuous molded web 60 having a pattern which is complementary to that of the roll. The web 60 is chilled by a flume or water spray 62, and after sufficient contact with the roll 58 which is internally cooled, the cooled web is removed from the roll by take-off rolls 64 aided by a stripper roll 66 and mold release agent applied by spray nozzles 68 to the surface of the roll prior to passage under die 54. Longitudinal dividing or trimming of web 60 is accomplished by one or more blades 70 positioned between the take-off rolls 64 and feed rolls 72 which pass the web to a defilming station which will be explained hereinafter.

To further describe the die 54 and patterned roll 58, which comprise the molding apparatus, FIG. 7 shows one embodiment in which die 54 contains a cavity 74 serving as path 56 (FIG. 6) and which is supplied with molten thermoplastic resin 76 through inlet pipe 77 by extruder 50. Cavity 74 terminates in a slot-shaped outlet 78 extending across the surface of roll 58. The rearward and forward edges of outlet 78 are defined by a die plate 80 and a doctor blade 82, each adjustably spaced from roll 58 and secured to die 54 by bolts 84 extending through slots 86. The pressure upon the molten resin 76 in the cavity forces the resin through outlet 78 and into the roll pattern represented by discontinuous transverse grooves 88 (enlarged in spacing and width for clarity) and circumferential intersecting grooves 89. The cavity 74 and outlet 78 are substantially free of constriction so that the pressure on the resin at the surface of roll 58 is substantially the same as the pressure on the resin in cavity 74.

The grooves 88 and 89 mold one surface of the web 60. The opposite surface of the web is formed by doctor blade 82 which is adjustably spaced from roll 58 to give the web thickness desired. Die 54 is heated to a temperature above the resin melting temperature of the particular resin being used, by electrical heating elements 90 extending into corresponding wells in the die. The resin melting temperature is the minimum temperature at which a fresh sample of resin leaves a molten trail as it is moved slowly across a heated metal surface. This is also sometimes called the stick temperature.

Doctor blade 82 is heated by an electrical heating element 91 usually to a temperature which is equal to or greater than the temperature maintained by die 54. The outer face 93 of the doctor blade departs sharply from the path of web 60 so as to avoid sticking of the web to the hot doctor blade. Roll 58 is cooled to a temperature which is at least about 10° C. less than the resin melting temperature of the resin being molded, such as by passing a cooling medium through an interior passage 59.

In FIG. 8 essentially the same equipment arrangement as in FIG. 7 is used except that slot-shaped outlet 78 includes a wedge-shaped passage 102 extending in the direction of rotation of roll 58. The wedge-shape of the passage 102 is formed by doctor blade 82 having a slant surface 104 facing the roll 58. Movement of the surface of roll 58 past the opening 78 drags molten resin into the passage 102 wherein the flowing resin is forced into the pattern on roll 58. This drag flow pressure created in the passage 102 at the surface of the roll augments the pressure on the resin within cavity 74 of the die.

The molding apparatus of FIGS. 7 and 8 can be provided with water spray 62 and mold release spray nozzles 68 as shown in FIG. 6.

A pressure-seal relation between the outlet 78 for the molten thermoplastic resin and roll 58 is maintained so that the pressure on the resin in cavity 74 and the drag flow pressure, when the apparatus of FIG. 8 is employed, are available to force the resin into the pattern of roll 58 on a continuous and high speed of production basis. Generally, the resin in cavity 74 is under a pressure of at least 50 p.s.i.g. for resins that have fluid melts, such as polyamides, while for the more viscous resins, such as polyethylene, the pressure is generally above 175 p.s.i.g. There is a capability, however, of using much higher molding pressures, such as in excess of 1000 p.s.i.g., depending on the pattern being molded. The pressure-seal relation is obtained, in part, by adjusting the doctor blade 82 to constrict the flow space for the resin as it leaves outlet 78 and by having a sufficient rate of web formation for the viscosity of the particular resin being molded to prevent back flow under the die plate 80 which is generally spaced 2 to 10 mils from the surface of roll 58.

FIG. 9 shows means for laterally confining the molten thermoplastic resin as it leaves opening 78 so as to complete the pressure-seal relation. In FIG. 9, the doctor blade 82 is shown in operative position and provided with heating element 91. The lateral surface of the roll 58 is provided with a pattern consisting of discontinuous transverse groove 88 and continuous circumferential grooves 89, terminating at shoulders 110 formed between the surface of the roll and cylindrical ends 112 of reduced diameter extending from each end of the roll. The molten resin from cavity 74 is molded into a web which extends entirely across the grooved pattern. Further sideways flow of the resin, however, is prevented by a pair of end plates 114 adjustably spaced from roll 58 by bolts 115 passing through slots (not shown) in the end plates and tightened into die 54. The end plates 114 each lie close to the shoulders 110 and have a lower arcuate surface lying close to the corresponding surface of cylindrical ends 112. This close spacing, on the order of several mils, permits a small amount of molten resin to enter the tortuous path around shoulders 110 before chilling of the resin occurs. This chilling prevents sideways leakage of additional resin and loss of molding pressure. A low friction pressure sealing system, without the need for metal-to-metal contact or necessity for further lubrication, is provided by this small amount of resin entering between end plates 114 and roll 58. The end plates 114 also form the lateral sides for cavity 74 and the die outlet 78 which are coextensive therewith.

Means can also be provided for changing the spacing between the die 54 and the roll 58 to compensate for pressure fluctuations caused by extruder 50 so as to maintain a constant force on the resin entering the roll pattern. Exemplary of such means is the pivotal mounting of die 54 about a stub shaft 120, which is on center with the feed line between extruder 50 and the die, and providing a lever arm 122 having the desired weight 124 suspended therefrom as shown in FIG. 6. Excessive molding pressure is relieved by the die 54 rotating away from roll 58. Upon return of the pressure to normal, weight 124 restores the die 54 to its former position to produce web of the desired thickness.

To fill intricate patterns in the surface of the roll rotating at a given speed, not only must the pressure on the resin and its volume be sufficient, but the pressure must also be supplied for sufficient duration to cause the resin to flow into the pattern. To accomplish this, it is preferred, where possible depending on the pattern, to have the width of outlet 78 in the direction of rotation of roll 58 greater than at least one repeat unit in the pattern.

In operation, the roll 58 is rotated and molten thermoplastic resin is forced into the pattern of the roll. The resin is cooled and removed from the roll as a continuous, patterned web, with the pattern consisting of a plurality of longitudinally extending strands corresponding to grooves 89 and longitudinally spaced, staggered intersections corresponding to grooves 88. The geometry of the grooves 88 will, of course, control the configuration of the intersections, such as 14, of the final net. Thus, the design of the intersections of the net can be independent of the design of the strand. As a result of this, the net intersections are designed so as not to undesirably limit the extent to which the strand can be drawn before appreciable draw of the intersection occurs. In FIGS. 7 and 8, the grooves 88 are of greater depth than the grooves 89 so as to obtain an intersection of the type shown in FIGS. 1 and 2. Bridge 21 is helpful for mold release.

The web 60 can be made with slots 36 lying between adjacent strands, the slots corresponding to raised areas 130 (FIG. 9). It is generally more convenient, however, to operate with the doctor blade 82 spaced slightly, such as 0.001 to 0.003 in., from the surface of roll 58, whereby a thin film of like thickness lies between the strands 34 in the web as molded.

This film can be removed by heating the web sufficiently to melt the film, which results in the film retreating or drawing-back into the strands. The heating should be insufficient to melt or otherwise damage the resultant screen. Thermoplastic resins, particularly polyamides, tend to degrade when heated in the presence of oxygen at temperatures required for melting the film. Degradation can be avoided, however, by carrying out the heating very quickly and thereafter immediately quenching the defilmed web, or by excluding oxygen.

FIG. 6 shows apparatus for carrying out defilming of the web. The web 60 is passed through the nip of feed rolls 72 and downwardly in front of outlet 142 of a heater 140. The heater 140 receives air through inlet 144 and heats it to 700–800° C. by means of heating element 146, shown diagrammatically. The defilmed web is immediately quenched in water bath 148 at tap temperature as the web travels around guide roll 150 positioned therein and then through take-off rolls 152. The defilmed web 60 then corresponds to section A of the web 32 of FIG. 5.

Representative details of the manufacture of net such as hereinbefore described are as follows: The roll, such as roll 58, is 4 in. in dia. and has a 6 in. wide pattern in its surface, the pattern consisting of parallel circumferential grooves 0.037 in. wide x 0.050 in. deep and spaced 0.068 in. center-to-center, alternately interconnected by transverse grooves 0.105 in. long x 0.110 in. deep x 0.045 in. wide with the 0.110 in. depth tapering smoothly into the 0.050 deep circumferential grooves and with all surfaces forming the junction between grooves being rounded. The length of the raised surfaces 130 is 0.925 in. A drag flow type of die such as shown in FIG. 7, operating at temperature of 280° C. is used to force polyhexamethylene adipamide (nylon 66) into the pattern of the roll which is rotated at a surface speed of 15 ft./min. and maintained at a temperature of 80° C. Stearic acid mold release is applied to the roll prior to its passage under the die. The resultant web has a film ranging from 0 to 0.002 in. thickness between strands. The web is defilmed by passing it within ⅛ in. of the outlet of a heater 140 as hereinbefore described. The defilmed web is immediately quenched in water and is then longitudinally drawn about 3 times and transversely opened-up to yield a net having intersections corresponding to the dimensions of the transverse grooves in the roll, a strand cross-sectional area which is about ¼ of original area, and a stretched mesh length (in the machine direction) of about 3 in. The net is heat stabilized by heating with steam at 100° C. for ½ hr. The breaking strength (dry) of the strands is 23 lb. and the breaking strength (dry) of the strand intersection (any direction) is 20 lb.

Polyethylene net is made in the apparatus described in the foregoing paragraph at a die temperature of 275° C. for the linear polyethylene, a roll temperature of 90° C., and without the use of stearic acid mold release, all other conditions being essentially the same. The resultant defilmed web is drawn 6 times yielding an opened-up net having a stretched mesh length of 5½ in. The net is heat stabilized at 80° C. with hot water. The strands have a breaking strength of 12 lb. and the intersections 18 lb.

The thermoplastic resins which are useful in the present invention are any of which are extrudable into continuous solid shapes from a heated, molten condition and under relatively high pressures. Examples of suitable thermoplastic resins include polystyrene, high impact polystyrene, ABS resin, the saturated hydrocarbon polymers, such as polyethylene, linear or branched, propylene and copolymers thereof; ionomers such as described in Canadian Patents 674,595 and 713,631 both to R. W. Rees; copolymers of ethylene with an α,β-unsaturated carboxylic acid such as described in Brit. Patent 963,380 to Du Pont, and blends thereof with saturated hydrocarbon polymers and such blends containing co-crystallized oxide, water activated cross-linking agents such as described in U.S. pat. appl'n. Ser. No. 248,229, filed Dec. 21, 1962, by Halliwell et al.; halogenated or perhalogenated olefins, such as vinyl chloride polymer and melt fabricable tetrafluoroethylene polymers such as copolymers thereof with hexafluoropropylene, and chlorotrifluoroethylene polymer; polyvinyl acetate and copolymers thereof with saturated hydrocarbon polymers and optionally, the acid copolymers of Brit. Patent 963,380 to Du Pont; polymers of α,β-unsaturated carboxylic acid, such as polymethylmethacrylate; the polyamides such as polyhexamethylene adipamide (66 nylon), polyhexamethylene sebacamide (610 nylon), polycaprolactam (6 nylon), copolymers thereof, and blends of the polyamides with acid copolymers, ionomers, and/or saturated hydrocarbon polymers; polyoxymethylene polymer and copolymer; polycarbonate; polyethylene terephthalate.

The particular molding, defilming, and drawing temperatures employed in making net of the present invention will depend upon the resin being molded and upon such operating conditions as the speed of the patterned roll 58 and the intricacy of the pattern therein. Typical operating temperatures, including heat stabilization temperature for stabilizing oriented web from shrinkage, for some of the thermoplastic resins suitable for use in the present invention are as follows:

| Resin | Molding temp., °C. | Draw temp., °C. | Heat stabilization temp. °C |
|---|---|---|---|
| Linear polyethylene [1] | 200–250 | 50–120 | 90 |
| Branched polyethylene [2] | 180–190 | 20–60 | |
| Polypropylene | 200–250 | 50–135 | 100 |
| Polystyrene | 240–280 | 135 | 90 |
| Polyvinyl chloride | 150–170 | 100 | 95 |
| 66 nylon | 260–350 | 125–230 | 170 |

[1] Frequently called high density polyethylene.
[2] Frequently called low density polyethylene.

The wedge-shaped passage 102 can be of any configuration which augments the molding pressure supplied by the extruder. Generally, the passage 102 will take the form of converging surfaces, with the roll pattern forming one of these surfaces. The pressures required on molten thermoplastic resin in cavity 74 can be less than the full extrusion pressure of the extruder, depending upon which resin is employed and upon operating conditions. The pressure in the cavity 74, however, is substantially the same as the pressure on the resin coming into contact with the pattern of the roll surface. When such pressure is insufficient, the drag flow arrangement of FIG. 7 can be used to increase the force present for continuously filling the pattern with molten resin. The intersections of the nets of this invention do not have to be entirely unoriented, but need be only substantially so since a small amount of draw, e.g. less than about 10% of the original length of the intersection generally does not have an appreciable adverse effect on the finished net. The longitudinal draw of the net strands is done at a temperature which is below the melting temperature of the particular resin being used.

The net of the present invention is particularly useful as fish net and other purposes for which nets are normally used, such as reinforcement application. Net made of the more expensive fluorocarbon polymers finds use in the chemical process industries for holding articles in normally corrosive environments.

As many apparently widely different embodiments of this invention may be made without departing from the spirit and scope thereof, it is to be understood that this invention is not limited to the specific embodiments thereof except as defined in the appended claims.

What is claimed is:

1. Uniaxially drawn, biaxially strong net of intersecing strands of thermoplastic resin, the intersections of said strands being uniplanar, integrally molded and substantially non-oriented and the strands between said intersection being oriented, said intersections being at least 50% of the strength of a strand of said net coming into its respective intersection, said intersections and strands forming diamond-shaped apertures, the orientation of said strands being obtained by longitudinal draw of at least 2.5 times their original length, each said intersection consists of a pair of sections which are thick in cross-section extendng out of the plane of the net on one side thereof relative to the cross-section of said strands, with said sections tapering into their respective strands, and a bridge extending out of the plane of said net along with said sections and integrally molded between said sections to join them together, the width of said bridge being a fraction of the length of said sections, said sections each having a cross-sectional area which is at least three times the cross-sectional area of a drawn strand tapering thereinto prior to the junction with said bridge and said bridge having a cross-sectional area of at least three times that of each said strand, the transition between the orientation of said strands to the non-orientation of said intersections occurring in said pair of sections preceding said bridge.

2. The net of claim 1 wherein said intersections have at least 75% of the strength of a strand of said net coming into its respective intersection.

References Cited
UNITED STATES PATENTS

| | | | |
|---|---|---|---|
| 3,085,292 | 4/1963 | Kindseth | 18—55 |
| 3,137,746 | 6/1964 | Seymour et al. | 264—73 |
| 3,222,440 | 12/1965 | Murphy | 264—164 |
| 3,386,876 | 6/1968 | Wyckoff | 161—402 X |

ROBERT F. BURNETT, Primary Examiner

R. L. MAY, Assistant Examiner

U.S. Cl. X.R.

161—116, 402; 264—167, 210